United States Patent
Topolovec et al.

(10) Patent No.: US 9,393,863 B2
(45) Date of Patent: Jul. 19, 2016

(54) FUEL FILLER SPUD DIFFUSER

(71) Applicant: FORD GLOBAL TECHNOLOGIES, LLC, Dearborn, MI (US)

(72) Inventors: Frank Topolovec, Canton, MI (US); Dennis Michael Harrigan, Monroe, MI (US); Daniel Frank Cragel, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 85 days.

(21) Appl. No.: 14/180,377

(22) Filed: Feb. 14, 2014

(65) Prior Publication Data

US 2015/0231967 A1  Aug. 20, 2015

(51) Int. Cl.
*B60K 15/04* (2006.01)
*B60K 15/077* (2006.01)
*B60K 15/03* (2006.01)

(52) U.S. Cl.
CPC .............. *B60K 15/04* (2013.01); *B60K 15/077* (2013.01); *B60K 2015/0344* (2013.01); *B60K 2015/03072* (2013.01); *B60K 2015/0477* (2013.01)

(58) Field of Classification Search
CPC ................. B60K 15/04; B60K 15/077; B60K 2015/03072
USPC .............. 220/86.1, 86.2, 562, 563, 581, 4.12, 220/4.14, DIG. 24
See application file for complete search history.

(56) References Cited

U.S. PATENT DOCUMENTS

| | | | | |
|---|---|---|---|---|
| 4,743,408 A | * | 5/1988 | Schwarze | ...................... 261/123 |
| 4,838,307 A | * | 6/1989 | Sasaki | .................. B60K 15/077 123/514 |
| 5,568,828 A | * | 10/1996 | Harris | ..................... B60K 15/04 137/514.5 |
| 6,807,952 B1 | * | 10/2004 | Amellal et al. | ................ 123/516 |

* cited by examiner

*Primary Examiner* — Robert J Hicks
*Assistant Examiner* — Kareen Thomas
(74) *Attorney, Agent, or Firm* — Joseph E. Root

(57) ABSTRACT

A system for diffusing a fuel flow for a vehicle. The system includes a fuel tank, containing fuel in both liquid and vapor form. A fuel filler spud extends from a fuel inlet on the exterior of the vehicle into the fuel tank and defines a fuel outlet there. A diffuser is mounted on the fuel filler spud for diffusing fuel flowing into the tank. The diffuser can take the form of a tongue-like protrusion, which can have flow channels or grooves, as well as flow diverters, which can be arranged in a matrix in the fuel outlet.

12 Claims, 4 Drawing Sheets

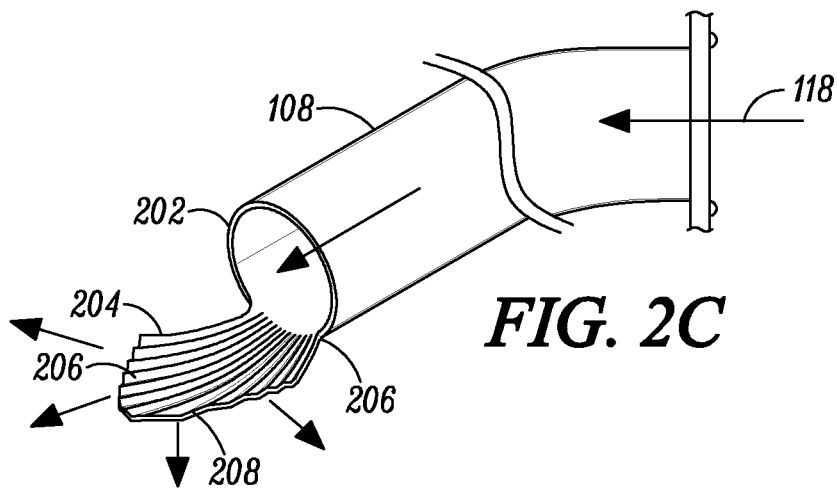
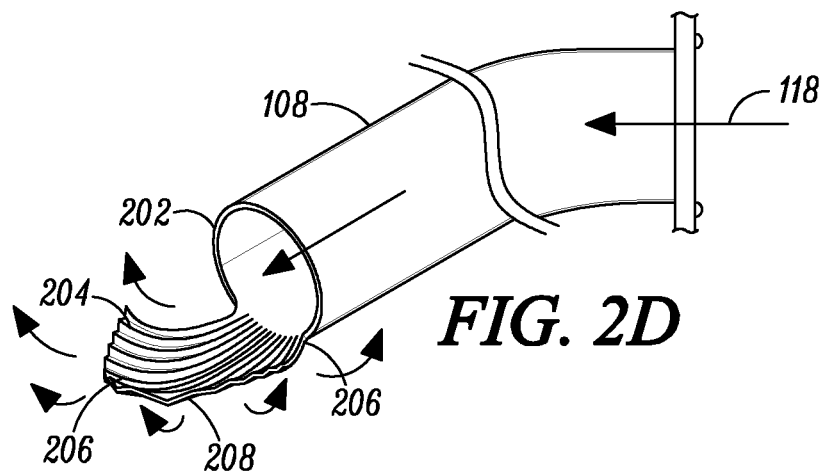
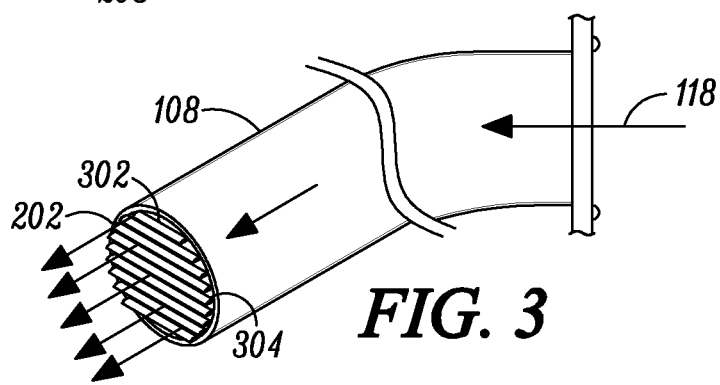

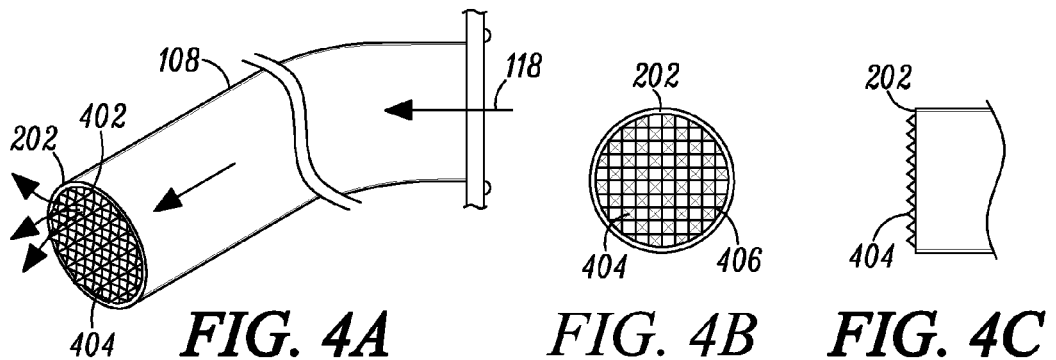
*FIG. 4A*  *FIG. 4B*  *FIG. 4C*
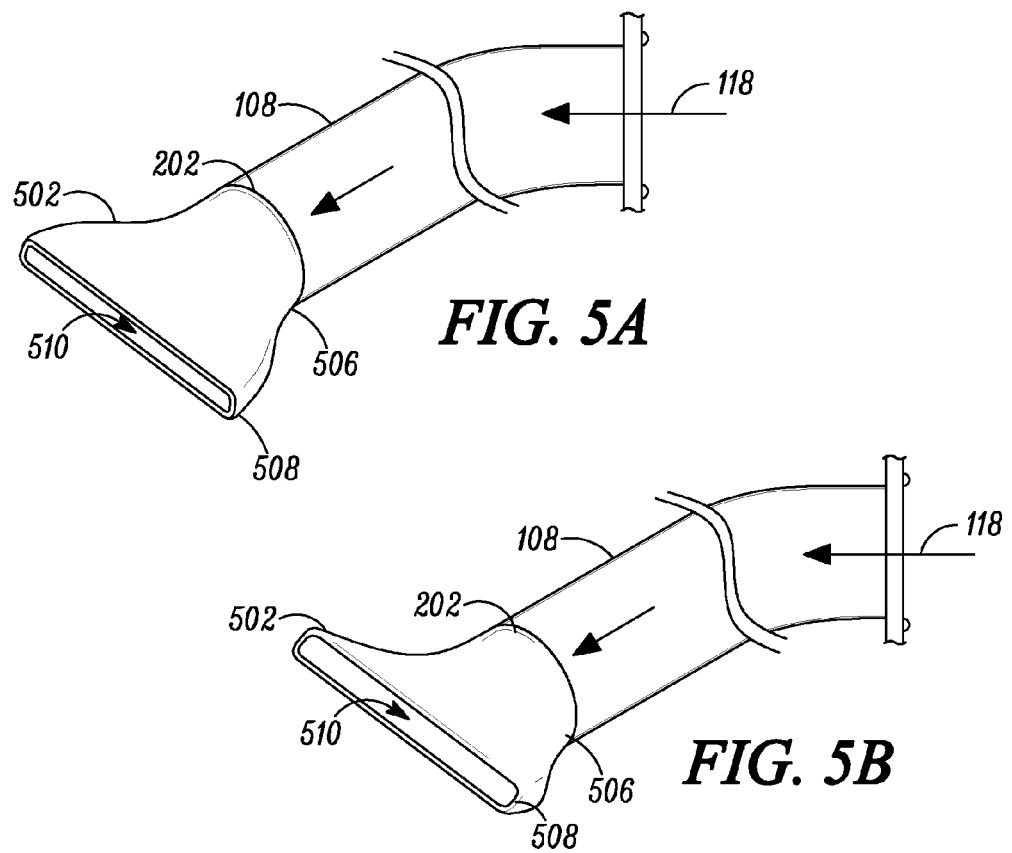
*FIG. 5A*
*FIG. 5B*

FUEL FILLER SPUD DIFFUSER

TECHNICAL FIELD

Embodiments of the present disclosure generally relate to reducing fuel vapor in a vehicle fuel tank, and, more particularly, to a fuel filler system.

BACKGROUND

As health and environmental issues become more prominent, government agencies have reacted by promulgating mandates to prevent the escape of volatile hydrocarbon vapors to the atmosphere. Industry has repeatedly focused its attention on curtailing hydrocarbon vapor release from vehicular fuel tanks containing gasoline or other highly volatile hydrocarbon fuels. The industry has responded to this danger by employing an on-board Evaporative Emission Control (EVAP) System to prevent vapor escape. Briefly, an EVAP system includes a canister, containing activated carbon pellets, connected by vapor flow lines to the fuel tank and to the vehicle's intake manifold. As vapor is formed in the fuel tank, it can flow to the canister, where vapor is adsorbed by the pellets. Periodically, a purge cycle sends accumulated vapor from the canister to the intake manifold to be combusted.

An EVAP system does not offer perfect vapor control, however. For example, a canister may become saturated, which can lead to vapor escape as excess vapor is generated. Fuel refill events can pose a particular problem, as incoming fuel forces existing vapor in the fuel tank into the canister, where the surge of vapor can swamp the canister's capacity. Thus, EVAP systems by themselves may not be the entire answer to vapor emission problems.

Conventional responses to the risk of vapor emission have focused on increasing the size of the canister. That solution, however, increases direct cost, in terms of the canister itself, but the larger canister requires further modifications to the automotive design, further increasing costs.

As vapor release remains a substantial risk, controlling fuel vapor emissions effectively remains a priority in modern vehicles.

SUMMARY

Additional aspects, advantages, features and objects of the present disclosure would be made apparent from the drawings and the detailed description of the illustrative embodiments construed in conjunction with the appended claims that follow.

An aspect of the present disclosure is a system for diffusing a fuel flow for a vehicle. The system includes a fuel tank, containing fuel, a portion of which exists in the form of vapor. A fuel filler spud defines a fuel inlet on the vehicle exterior and extends into the fuel tank to define a fuel outlet therein. A diffuser is mounted on the fuel filler spud for diffusing fuel flowing into the tank.

In a related aspect of the disclosure, the diffuser is a tongue-like protrusion. The diffuser may be provided in any of a number of forms, including a protrusion having flow channels or grooves formed on its surface, for splitting the flow into at least two streams. Another form can have a tip end wider than the end abutting the fuel filler spud, or the tip end can be curved toward a tank ceiling.

Other aspects of the disclosure could include one or more fuel flow diverters positioned at the fuel outlet, alternatively including diverters positioned in parallel or independent of other diverters' directions. An alternative arrangement could position the diverters in a matrix in the fuel outlet. Another aspect of the disclosure could provide an outlet structure to deliver fuel in a wide sheet-like flow.

BRIEF DESCRIPTION OF THE DRAWINGS

The figures described below illustrate a number of exemplary embodiments of the disclosure. Throughout the drawings, like reference numerals refer to identical or functionally similar elements. The drawings are illustrative in nature and are not drawn to scale.

FIGS. 2A, 2B, 2C, and 2D, illustrate exemplary fuel filler spuds having protrusions according to the present disclosure.

FIG. 3 illustrates a fuel diffuser having flow diverters.

FIG. 4A depicts an embodiment having multiple flow diffusers set in a matrix.

FIGS. 4B and 4C are respective front and side views of the embodiment of FIG. 4A.

FIGS. 5A and 5B illustrate diffusers set forth as an enclosed arrangement with the fuel filler spud.

DETAILED DESCRIPTION

The following detailed description is made with reference to the figures. Exemplary embodiments are described to illustrate the subject matter of the disclosure, not to limit its scope, which is defined by the appended claims.

Overview

In general, the present disclosure describes a fuel delivery system that reduces fuel vapors produced during a refueling event. To this end, the system includes a fuel filler spud extending into the fuel tank from a vehicle exterior. A fuel inlet at the vehicle exterior allows fuel inflow, while a fuel outlet facilitates fuel exit into the fuel tank. A fuel diffuser disposed at the fuel outlet aids in diffusing the inflow, increasing the incoming fuel's surface area, and thereby, exchanging heat with fuel vapors within the tank. As a result, vapor within the tank cools and condenses rather than flowing to the canister.

Exemplary Embodiments

The following detailed description illustrates aspects of the disclosure and its implementation. This description should not be understood as defining or limiting the scope of the present disclosure, any such definition or limitation being solely contained in the claims appended hereto. Although the best mode of carrying out the invention has been disclosed, those in the art will recognize that other embodiments for carrying out or practicing the invention are also possible.

Figure 1:
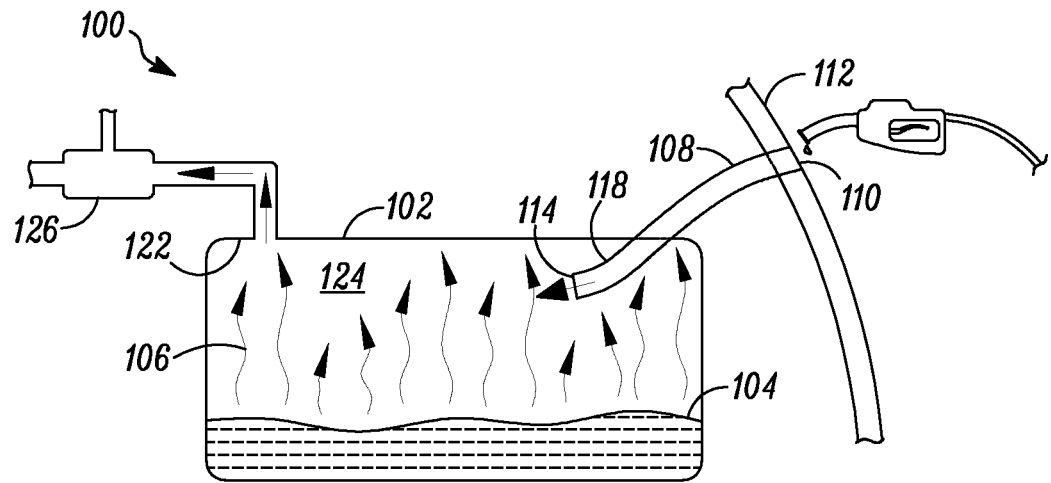
FIG. 1 depicts an exemplary fuel delivery system including a fuel filler spud communicating with a fuel tank according to the present disclosure.

Turning to FIG. 1, an exemplary fuel delivery system 100 in a vehicle (not shown) is illustrated. System 100 includes a fuel tank 102 containing fuel 104. Within the fuel tank 102, the volume of fuel vapors 106 increases over time owing to lowered fuel level in the tank as well as increases in ambient temperature. A fuel filler spud 108 extends from a fuel inlet 110, provided on a vehicle exterior 112, into the fuel tank 102, to fuel outlet 114. That arrangement facilitates a passage for fuel inflow 118 to the system 100. The fuel tank 102 includes a tank ceiling 122, a tank interior 124, and is in fluid communication with a vapor canister 126.

In general, fuel vapor volume within the fuel tank 102 increases owing to relatively high internal temperatures, particularly during daylight hours. Incoming fuel 118 flows into the tank 102, pushing the existing fuel vapor 106 into the vapor canister 126. Added vapor in the canister may saturate the activated carbon pellets, giving rise to a serious risk of vapor emission.

The present disclosure takes advantage of the fact that incoming fuel 118 is generally cooler than the fuel 104 within tank 102. If the vapor 106 can be placed in an efficient heat exchange relationship with incoming fuel 118, the vapor could cool sufficiently to condense rather than flowing to canister 126. The present disclosure creates such a heat exchange relationship by diffusing the incoming fuel, greatly increasing the surface area of the fuel as it passes through the vapor 106.

Figure 2A:
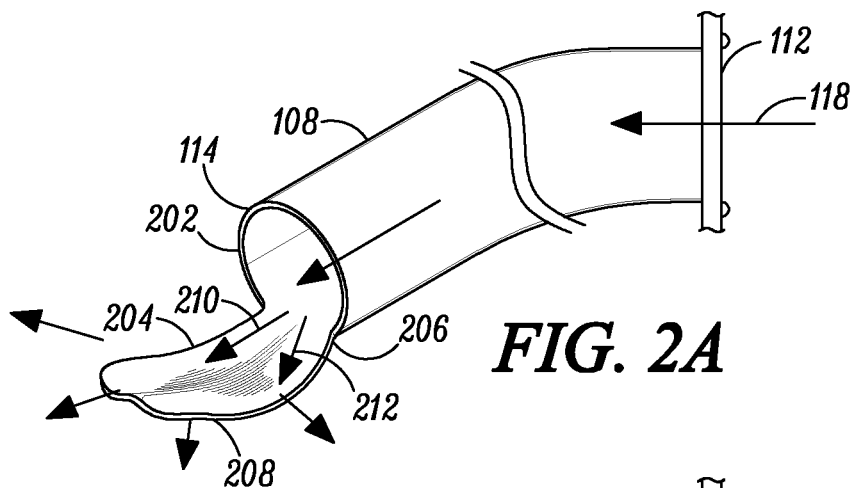

Conventionally, a fuel filler spud outlet is simply the generally circular end of a tube extending from the fuel inlet 112 into the fuel tank 102. FIG. 2A illustrates a fuel filler spud 108 of the present disclosure. Here, the spud 108 may have a circular or an elliptical cross-section, but the outlet 202 includes a protrusion 204 extending beyond the remainder of outlet 202. Protrusion 204 is generally tongue-like, located at the bottom of outlet 202. In the illustrated embodiment of FIG. 2A, protrusion 204 may curve generally upward and expand in width as it extends from outlet 202, so that the tip 208 of protrusion 204 is wider than the point at which protrusion 204 joins outlet 202. While this embodiment extends around the outlet 202 for an angular distance of less than 90°, other embodiments may be wider or narrower at the point of joining outlet 202.

Functionally, protrusion 204 alters the incoming fuel flow 118 from a unitary stream to a spray, preferably a spray of droplets. That process is assisted by longitudinal depressions and ridges within the protrusion 204, which split the fuel inflow into two streams 210, 212. Those streams exit the protrusion 204 as a diffused fan of droplets, offering a vastly increased surface area for heat transfer as the fuel falls toward the existing fuel level.

Figure 2B:
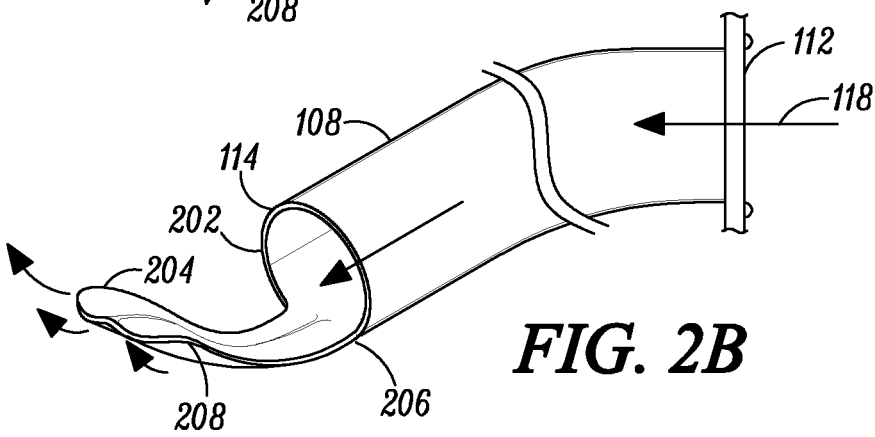

In another embodiment, shown in FIG. 2B, the tongue-like protrusion 204 is sharply curved upward towards the tank ceiling 122, resembling a ski jump. That arrangement allows the fuel inflow 118 to split, then curve upwards, and finally hit the tank ceiling 122, before falling toward the existing fuel level, thereby enhancing the degree of diffusion.

An alternate embodiment shown in FIG. 2C provides grooves 206 formed in the tongue-like protrusion 204 to further assist fuel diffusion. Upon encountering the grooves 206, fuel inflow 118 is split into multiple streams, effectively increasing an overall fuel inflow surface area and enhancing the extent of the resulting diffusion.

Grooves 206 may vary in number, extending along the flow path from the outlet periphery 202 to the delivery end 208, and may be V-shaped in their cross-sectional profile. Other cross-sectional profiles, such as rectangular, circular, or irregular profiles, may be contemplated. Alterations may include every consecutive groove 206 defining a different cross-sectional profile for serving specific delivery functions. Moreover, multiple cross-sectional profiles may be contemplated along singular grooves 206 as well. For example, grooves 206 may be narrower at the fuel-receiving end 206, and wider towards the delivery end 208. As another example, grooves 206 having a rectangular profile at the fuel-receiving end 206 may merge with a V-shaped profile towards the fuel delivery end 208.

Grooves 206 provide the fuel inflow with enhanced diversion characteristics, allowing the fuel to spread out and sprinkle into the tank 102 more evenly then with other embodiments. Thus, protrusion 204 may operationally replicate a fuel sprinkling mechanism.

Similar to the arrangement shown in FIG. 2B, the embodiment of FIG. 2D provides a sharp upward curve to the tongue-like protrusion 204. That curvature causes the incoming fuel flow first to diverge, splitting the flow into multiple streams, and then to curve upward, splashing against the tank ceiling 122, before falling to the existing fuel level.

In both cases (FIG. 2B and FIG. 2D), splashing against the tank ceiling 122 first increases the diffusion of the flow, and, second, it facilitates the diffused fuel's wider reach and contact with vapor above the fuel outlet 114. Diffusion is further enhanced when the tank ceiling 122 includes at least one of a baffle or rib (discussed below) towards which the tongue-like mechanical protrusion 204 is aimed.

As an alternative to employing a protrusion as a diffusion device, FIG. 3 depicts an embodiment where fuel outlet 114 includes flow diverters 302 positioned within the outlet 202. Flow diverters 302 are a series of slat-like structures arranged in a parallel array. Each flow diverter(s) 302 is aerodynamically shaped to allow fuel to flow across its cross-sectional profile with sufficient ease. Preferably, thin strips of chemically stable, high-grade plastic form the structure, and may include mechanisms (not shown) to uniformly divert the fuel inflow by tilting the flow diverters 302 in a desired direction. Flow diverters may be tilted and controlled independently as well. For example, some flow diverters 302 may direct the fuel to flow upwards to hit the tank ceiling 122, while some may allow the fuel to flow straight ahead, along the spud axis. Additionally, some may point downwards into the tank 102, or elsewhere. Each flow diverter 302 may also be tilted in a crisscross manner, so that fuel flow streams collide, producing further diffusion.

Further variations to this design are possible, such as a multi-slat design that includes different sets of flow diverters, assembled into the outlet periphery 202 to create a multi-directional output flow. Those skilled in the art are able to easily to effectuate these options and their system requirements. Mechanisms, well known in the art, may impart provisions to tilt the flow diverters 302 during fuel inflow operations as well.

In an alternative structure, shown in FIGS. 4A, 4B, and 4C, a group of alternatively situated flow diffusers 402 positioned as a matrix within outlet 202 serve to diffuse the fuel. There, each flow diffuser 402 is a relatively small, pyramid-shaped solid, arranged with its tip 404 facing in the direction of flow. The set of flow diffusers 402 is arranged with adjacent diffusers joined at their respective corners 406. This arrangement leaves an empty fluid flow space on four sides of each flow diffuser 402. In this manner, fuel flowing into the tank first encounters a smaller area (rectangular in this case) to pass through, and as the tips 404 converge at a point (tip 404), fuel flow paths diverge, providing a high degree of turbulence in the outflow, causing the stream to diffuse as it emerges from the outlet 202.

Other embodiments may employ a variety of shapes for the diffusers 402. For example, conical diffusers may effectively replace the pyramid shape diffusers 402. Elongated shapes and similar structures could also be used, as could a variety of other shapes within the ability of those in the art to contemplate.

FIG. 5A depicts yet another embodiment for producing a diffused fuel flow. This embodiment includes a sheet outlet 502, arranged to output the fuel flow in a thin sheet-like flow. The sheet outlet 502 includes an exit passage 510 formed as an elongated, relatively thin opening, so that the existing fuel flow has a considerably greater width, plus a considerably thinner cross-section than does the fuel flow through spud 108. The sheet-like structure of the emerging fuel flow promotes rapid diffusion into relatively small droplets. That process is also promoted by the higher velocity of the emerging stream, caused by the smaller cross-sectional area of exit 510 as compared to that of spud 108.

In a further variation, FIG. 5B depicts an embodiment where the sheet outlet 502 is curved upward toward the tank ceiling 122. That arrangement directs a fuel inflow to splash on the tank ceiling 122 before being delivered into the fuel tank 102, producing a highly diffused shower of droplets falling through fuel vapor 106. To increase fuel diffusion, regions or flow paths within the enclosed arrangement 502 may accommodate additional curves, bends, grooves, etc.

Figure 6:
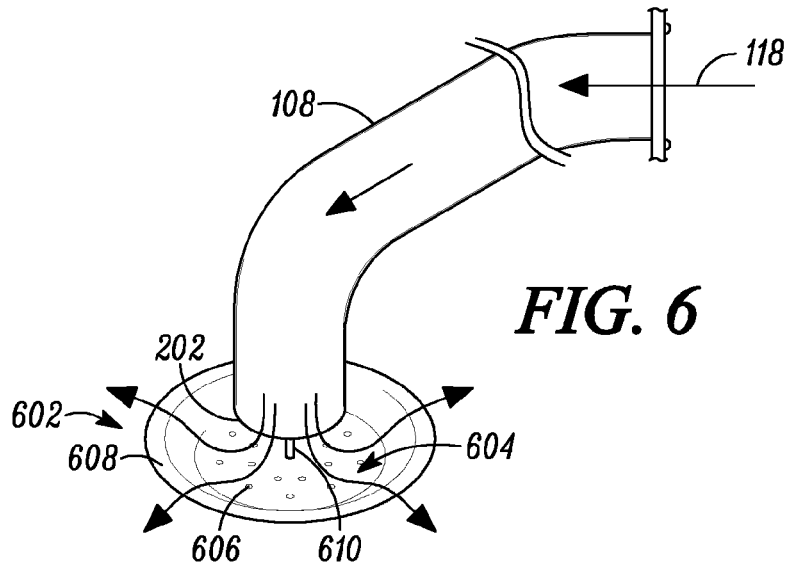
FIG. 6 depicts an exemplary diffuser including an apparatus facing the fuel filler spud's outlet.

In further alternative embodiments, exemplified by the embodiment shown in FIG. 6, a baffle or other suitable component may be positioned in the outflow path of exit 510, further diffusing the output flow. Here, a baffle pan 602 is immediately adjacent the outlet periphery 202, such that trough portion 604 receives and deflects the fuel outflow stream. The substantially circular profile of baffle pan 602 includes relatively small apertures 606 through its surface, as shown, promoting drainage from the trough portion 604. Trough portion 604, together with outer lips 608 disperses the fuel flow in a circular pattern throughout the tank, promoting efficient heat transfer. In other embodiments, grooves or channels (not shown) may be structured into the outer lip 608, to assist in flow direction. Baffle pan 602 may be supported from either spud 108 or fuel tank 102, in any suitable manner. For example, a pin 610 may extend from the outlet 202, riveted to the center of baffle pan 602.

A wide variety of variations to the arrangement of FIG. 6 will be apparent to those of skill in the art. For example, the baffle pan 602 may be reversed, or tilted, to produce a desired diffusion pattern. Alternatively, other differently shaped components and arrangements may be contemplated. For example, a cylindrical component may be placed at right angles to opening 202, producing a diffused flow pattern similar to that resulting from baffle pan 602.

Figure 7A:
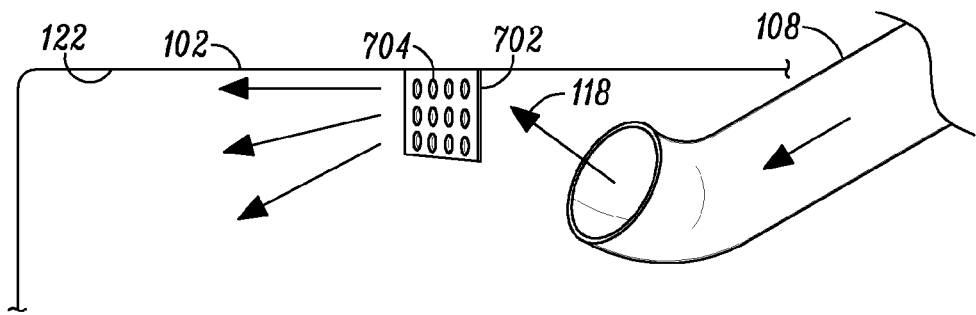
FIGS. 7A and 7B depict exemplary embodiments where a fuel inflow is directed to a baffle within the fuel tank.
Figure 7B:
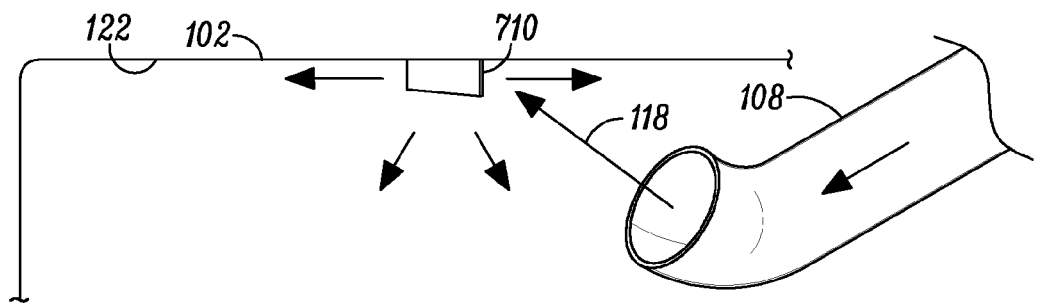

FIGS. 7A and 7B depict yet another embodiment, in which fuel filler spud 108 aims output flow 118 towards a baffle plate mounted to an inside surface of fuel tank 102. More specifically, FIG. 7A depicts a baffle 702, attached to the tank ceiling 122, to which the fuel filler spud 108 delivers the fuel outflow for diffusion. FIG. 7B, conversely, describes a rib 710 within the fuel tank 102 which provides a similar fuel delivery diffusion means.

Baffle 702 is a rigid member attached to the tank ceiling 122, and it includes a chemically stable structure, providing an element having adequate thickness to withstand the pressure exerted by a fuel flow. Multiple apertures 702 pierce the surface of the baffle. Dimensionally, apertures (704) may vary and may be arranged as a specific pattern, array, or in any other desired manner on the baffle 702. Upon striking the baffle 702, the fuel inflow 118 encounters the apertures 704, so that one portion of the fuel flow 118 passes through the baffle and another portion bounces off the baffle in the opposite direction. Overall, the baffle can disperse the fuel flow widely within the fuel tank 102. That process breaks the fuel inflow 118 into multiple streams, eventually diffusing the fuel before falling toward the existing fuel level. Applications targeting an inflow to the rib 710 may benefit from using an existing component of fuel tank 102 to provide a structure for that rib, neutralizing additional cost and complexity requirements while attaining desired results.

Implementations may also include a combination of the described embodiments working together to diffuse the fuel flow. Though not explicitly shown, all the above embodiments having their diffusers directed towards the tank ceiling 122, may aim the fuel inflow towards at least one of the baffle 702 or the existing rib 710. Further, in all the above noted embodiments, a fuel inflow diffuser either can be integrated or may be removable from the fuel filler spud 108. Systems to bring those to affect may be well conceived.

During an exemplary operation, an operator provides a fuel inflow into the fuel tank 102, via the fuel inlet 110. The inflow, delivered at relatively lower temperatures, passes through the fuel filler spud 108 and reaches the fuel outlet 114 that opens into the tank interior 124. There, the inflow encounters one of the above disclosed diffusers, suitably positioned, facilitating an inflow split into at least two streams, thus initiating fuel diffusion. When a diffuser is directed into the fuel tank 102, a direct, but diffused fuel delivery occurs. Conversely, when the diffuser is directed towards the tank ceiling 122, the degree of diffusion is typically higher.

Instead of flowing smoothly, therefore, the inflow 118 undergoes substantial turbulence, eventually delivering the fuel as sprinkled droplets into the fuel tank 102. A higher surface area thus obtained accounts for a rapid heat transfer from the existing fuel vapor 106 to the fuel flow 118 as the two fluids interact. More particularly, fuel droplets promotes heat transfer from the fuel vapor 106 to the incoming fuel stream 118, and as the vapor temperature decreases, vapor condenses instead of flowing to the canister 126.

Further, the present disclosure is not limited to the disclosed embodiments, as those skilled in the art may ascertain multiple embodiments, variations, and alterations, to what has been described. Accordingly, none of the embodiments disclosed herein need to be viewed as being strictly restricted to the structure, configuration, and arrangement alone. Moreover, certain components, elements, etc., described in the application may function independently of each other as well, and thus none of the implementations needs to be seen as limiting.

Accordingly, those skilled in the art will understand that variations in these embodiments will naturally occur in the course of embodying the subject matter of the present disclosure in specific implementations and environments. It will further be understood that such variations will fall within the scope of the disclosure. Neither those possible variations nor the specific examples disclosed above are set out to limit the scope of the disclosure. Rather, the scope of claimed subject matter is defined solely by the claims set out below.

We claim:

1. A system for diffusing a fuel inflow for a vehicle, comprising:
    a fuel tank, containing fuel, a portion of which exists in the form of vapor, an upper portion of the tank forming a tank ceiling;
    a fuel filler spud, defining a fuel inlet on a vehicle exterior and extending into the fuel tank to define a fuel outlet; and
    a diffuser mounted on the fuel filler spud for diffusing fuel flowing into the tank, the diffuser being formed as a protrusion extending from a lower portion of the spud, generally curving upward toward the spud and expanding in width with respect to distance from the spud, the protrusion having a plurality of grooves formed thereon, for splitting the flow into at least two streams, thereby increasing a fuel inflow surface area and producing a diffused fuel flow;

wherein the tank ceiling includes at least one of a baffle or an existing rib, towards which the protrusion is aimed during operation, the protrusion being curved towards the tank ceiling, facilitating diffusion during fuel inflow.

2. The system of claim 1, wherein the diffuser includes one or more fuel flow diverters positioned at the fuel outlet.

3. The system of claim 2, wherein the flow diverters are positioned in parallel.

4. The system of claim 2, wherein each flow diverter direction is independent of other flow diverter directions.

5. The system of claim 1, wherein the diffuser includes a group of alternatively occurring flow diffusers positioned as a matrix and structured at the fuel outlet.

6. The system of claim 1, wherein the diffuser includes an enclosed arrangement structured at the fuel outlet, the enclosed arrangement configured to diffuse and deliver the fuel into the fuel tank.

7. The system of claim 6, wherein the enclosed arrangement includes a spud attachment end and a fuel delivery end, the fuel delivery end being adapted for outputting the fuel in a thin sheet flow.

8. The system of claim 6, wherein the enclosed arrangement is curved, with at least one portion towards the tank ceiling, directing the fuel inflow to splash on the tank ceiling before being delivered into the fuel tank.

9. The system of claim 1, wherein the diffuser includes an apparatus facing the fuel outlet, which upon encountering fuel inflow, facilitates a fuel inflow diversion and diffusion thereof.

10. The system of claim 9, wherein the apparatus is trough shaped and is secured to the fuel filler spud.

11. The system of claim 1, wherein the diffuser is integrated to the fuel spud.

12. The system of claim 1, wherein the diffuser is removable from the fuel filler spud.

\* \* \* \* \*